Oct. 21, 1958   E. D. CLARK ET AL   2,856,662
CABLE SHACKLE
Filed April 17, 1957

INVENTORS
Earl D. Clark
Reuben A. Stubberfield
BY
Ramsey and Kolisch
Attys ered Oct. 21, 1958

United States Patent Office

2,856,662
CABLE SHACKLE

Earl D. Clark and Reuben A. Stubberfield, Willits, Calif.

Application April 17, 1957, Serial No. 653,420

3 Claims. (Cl. 24—122.6)

This invention relates to a clamp or shackle mechanism and more particularly to a clamp or shackle for cables and the like adapted to firmly grip and support the end of a cable.

Generally, it is an object of this invention to provide a cable shackle operable to grab firmly the end of a cable without appreciable abrasion or wearing of the cable and capable of holding the cable end securely even when the cabe is tensioned under loads approaching the tensile strength of the cable.

Various forms of clamps, sockets, or babbitted connections have been used to secure the end of a cable. Most of the constructions known to date have not been entirely satisfactory since the connection between the cable and the structure holding the cable has tended to give or slip when the cable is tensioned under heavy loads. Further, certain clamping mechanisms presently used have created excessive abrasion in the cables held thereby or have set up concentrated stress points in the cable which have tended to severely limit the cable life.

Specifically, it is an object of this invention to provide a cable shackle for securing the end of a cable which comprises a pair of wedge or slip elements slidably received within a socket or ferrule member, so constructed and arranged that the cable strands making up the cable are individually subjected to a clamping pressure exerted from areas distributed about the surface of the strands, when a cable held by the shackle is under tension.

It is another object of this invention to provide a shackle for cables of the type hereinabove described wherein the cable strands are grasped without appreciable bending or deformation of the strands thereby minimizing the number of stress points set up in the cable.

Another object of the invention is to provide a cable shackle wherein the cable is gripped in a conically tapered throat section of the shackle, the throat section cooperating with a pair of complementary wedge elements having helical grooves formed therein to hold individually the outer, convolute strands normally found in a cable, and to provide such a cable shackle wherein the wedge elements include gripping surfaces for holding the center core strand normally present in a cable.

It is yet another object of this invention to provide such a cable shackle wherein the wedge elements holding the cable end are effective to gradually spread apart the outer convolute strands of the cable when gripping the cable end, thereby reducing the amount of bend produced in the cable strands, and to provide a cable shackle wherein the socket or ferrule member has a sleeve section at the base of the conically tapered throat section restraining portions of the cable lying below the wedge elements from separation.

These and other objects and advantages are attained by the present invention which is described hereinbelow in connection with the accompanying drawings wherein.

Figure 1:
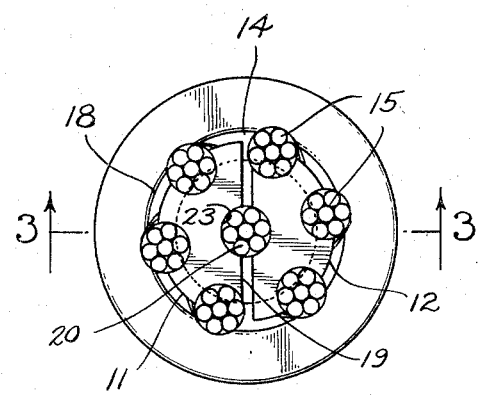
Fig. 1 is an end view of a cable shackle according to this invention, showing the socket member and wedge members of the shackle grasping the separated strands of a cable.

Referring to the drawings, an embodiment of this invention comprises in general a ferrule or socket member 10 and a pair of slip or wedge members 11 and 12, respectively. In practice, socket member 10 would be secured to some supporting structure, in a conventional manner, so as to hold securely the end of a cable 13 which is being tensioned by a force exerted downwardly in Fig. 3. Cable 13 is conventional, having a number of outer convolute strands 15 wrapped about a center core strand 20 extending through the middle of the cable.

Figure 3:
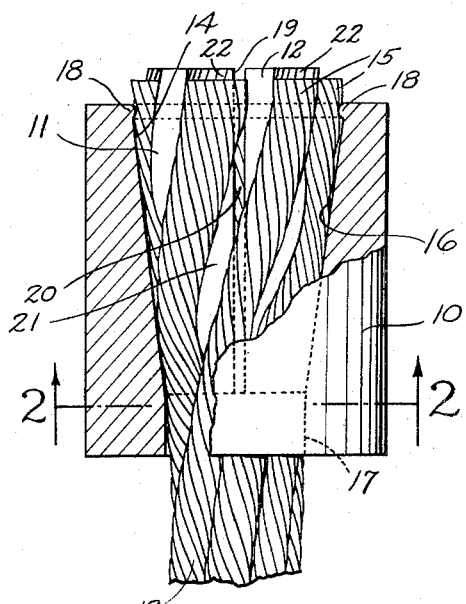
Fig. 3 is a section view along the line 3—3 of Fig. 1, illustrating the tapered throat section and cylindrical sleeve section of the socket member.

As can best be seen in Figs. 1 and 3, socket member 10 has inner wall portions defining an opening 14 extending through the socket member. Opening 14 includes a frusto-conical throat section 16, wherein the walls of opening 14 taper inwardly progressively downwardly in opening 14, and a sleeve section 17 adjacent the base or constricted end of throat section 16. Cylindrical sleeve section 17 has a diameter slightly in excess of cable 13 and provides a shoulder which the wedge elements act against in securing cable 13. Sleeve section 17 also functions to restrain separation of convolute strands 15 below throat section 16.

At the upper end of socket 10 is an annular rib or flange 18 protruding a small distance inwardly from the walls of opening 14. Flange 18 contacts the outer surfaces of the cable strands at the upper end of socket 10. Flange 18 is provided with rounded corners to minimize abrasion of the cable at the point of contact between the cable and the rib. In gripping a cable end, flange 18 serves to exert a laterally inward pressure on portions of the cable and wedge elements lying at the upper end of socket 10, thereby forcing lower end portions of the wedge elements outwardly against the walls of throat 16.

Wedge elements 11 and 12 each have an inner face 19 which face each other when the wedge elements are assembled in socket 10 and an outer tapered side 21 which contains a series of helical grooves 22. The outer tapered side of each of the wedge elements is arced transversely of the taper for the wedge element to enable the wedge element to fit loosely within throat 16. The wedge elements, when assembled with a cable end in throat section 16, form substantially the frustum of a cone somewhat smaller in size than the dimensions of frusto-conical section 16.

As can best be seen in Fig. 3, the pitch of helical grooves 22 conforms substantially to the pitch of the convolute strands of cable 13. Thus, when the convolute strands are within grooves 22, the twist of the portions of the convolute strands seated in socket 10 is maintained more or less the same as the twist of the portions of the convolute strands lying outside socket 10. The grooves in each of the wedge elements complement each other, that is to say, as may be seen with reference to Fig. 3, a groove terminating at the edge of the tapered side of one of the wedge elements is continued by a groove in the other of the wedge elements. Thus, a continuous path is provided for the reception of a convolute strand as the strand passes over from one to the other of the wedge elements.

Along the inner face of each of the wedges is a longitudinal slot 23 adapted to receive center strand 20 of the cable. Slots 23 are only partially as deep as the radius of center strand 20 so that in gripping a cable end, the inner faces of the wedges never come in contact with each other. Helical grooves 22 are only partially as deep as the diameter of convolute strands 15, and in this way strands seated within the helical grooves prevent the tapered sides of the wedge elements from contacting throat section 16. In this manner, the convolute strands and core strand of a cable are securely clamped within the shackle by wedge elements 11, 12.

The walls of throat 16 preferably are inclined rather slightly relative to a vertical extension of the walls of sleeve section 17 to minimize the bend and abrasion imparted to the cable wherein the sleeve section and throat 16 join each other.

Figure 2:
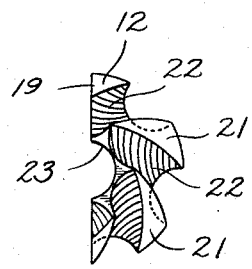
Fig. 2 is an end view of one of the wedge members, along the line 2—2 of Fig. 3.

As best illustrated in Fig. 2, the tapered side and the inner face of each wedge element converge at the bottom end of the wedge element so as to form a relatively sharp edge at the bottom edge of the wedge element. Thus, bending of the cable strands and abrasion of the strands at the point where the strands start to be spread apart by the wedge elements is minimized.

When the shackle of this invention is employed to secure the end of a cable, the convolute strands of the cable are first unraveled from the center core strand along a length of cable approximating the length of throat section 16. The convolute strands are then fitted within the helical grooves in the tapered sides of the wedge elements, the strands occupying substantially the same pitch they occupied in the cable. The core strand of the cable is laid along the inner slots carried by the inner faces of the wedge members. The wedge members and cable strands are then drawn downwardly into the interior of socket 10 and a wedging action created between the wedge members and the socket member.

When tension is applied to the cable, it will be apparent that each of the outer convolute strands, as well as the center core strand, is firmly locked by the action of the wedging members and the socket member. Clamping pressure is exerted on the strands from areas distributed about the surface of the strands enabling the production of an extremely fast connection. While producing this clamping pressure, bending or deformation of the cable strands is maintained at a minimum.

Employing the construction described above, it has been found that the end of a cable may be secured to withstand tensioning of the cable under loads approximating and even exceeding the rated tensile strength of the cable. When it is desired to unfasten the cable end, the wedges in the cable may be quickly disassociated from each other. The device employs a minimum number of amount of parts, lending itself to economical manufacture.

It is claimed and desired to secure by Letters Patent:

1. A shackle for cables and the like comprising a socket member having inner wall portions defining an opening extending through said socket member, said opening having a smooth continuously curved frusto-conical throat section defined by said wall portions, and a pair of elongated wedge elements, each having an inner face and an outer tapered side, received within said throat section with said inner faces facing each other, each of said wedge elements having a linear longitudinal slot along its inner face for the reception of the center strand of a cable and helical grooves partially as deep as the diameter of the convolute strands of a cable formed in its outer tapered side, the grooves of one of said wedge elements complementing the grooves of the other of said wedge elements so that a groove extending to the edge of the tapered side of one of said wedge elements is continued by a groove in the other of said wedge elements.

2. A shackle for cables and the like comprising a socket member having inner wall portions defining an opening extending through said socket member, said opening having a smooth continuously curved frusto-conical throat section defined by said inner wall portions, said opening also having an annular flange defined by said wall portions at the wider of the two ends of said throat section projecting radially inwardly, and a pair of wedge elements, each having an inner face and an outer tapered side, received within said throat section with said inner faces facing each other, the outer tapered side of each of said wedge elements being arced transversely of their taper so as to fit loosely within said throat section, each of said wedge elements having a linear longitudinal slot along its inner face for the reception of the center strand of a cable and helical grooves partially as deep as the diameter of the convolute strands of a cable strand formed in the outer tapered side, the grooves of one of said wedge elements complementing the grooves of the other of said wedge elements so that a groove extending to the dege of the tapered side of one of said wedge elements is continued by a groove in the other of said wedge elements, said annular flange exerting a laterally inward pressure on the upper ends of said wedge elements when clamping onto a cable.

3. A shackle for cables and the like comprising a socket member having inner wall portions defining an opening extending through said socket member, said opening having a smooth continuously curved frusto-conical throat section defined by said inner wall portions, said opening having an annular flange defined by said wall portions at the wider of the two ends of said throat section projecting radially inwardly, a cylindrical section adjacent the constricted end of said throat section of a diameter slightly in excess of the diameter of a cable secured in the shackle, and a pair of wedge elements, each having an inner face and an outer tapered side, received within said throat section with said inner faces facing each other, the outer tapered side of each of said wedge elements being arced transversely of their taper so as to fit loosely within said throat section, each of said wedge elements having a linear longitudinal slot along its inner face for the reception of the center strand of a cable and helical grooves partially as deep as the diameter of the convolute strands of a cable strand formed in the outer tapered side, the grooves of one of said wedge elements complementing the grooves of the other of said wedge elements so that a groove extending to the edge of the tapered side of one of said wedge elements is continued by a groove in the other of said wedge elements, the inner face and tapered side of each of said wedge elements converging at the bottom end of the wedge element to form a relatively sharp edge at said bottom end, said annular flange producing a laterally inward pressure on the upper ends of said wedge elements when clamping onto a cable.

References Cited in the file of this patent

UNITED STATES PATENTS

| 2,157,227 | Brickman et al. | May 9, 1939 |
| 2,341,922 | King et al. | Feb. 15, 1944 |